No. 749,795. PATENTED JAN. 19, 1904.
J. KERMATH.
TROLLEY STAND.
APPLICATION FILED OCT. 9, 1903.
NO MODEL.
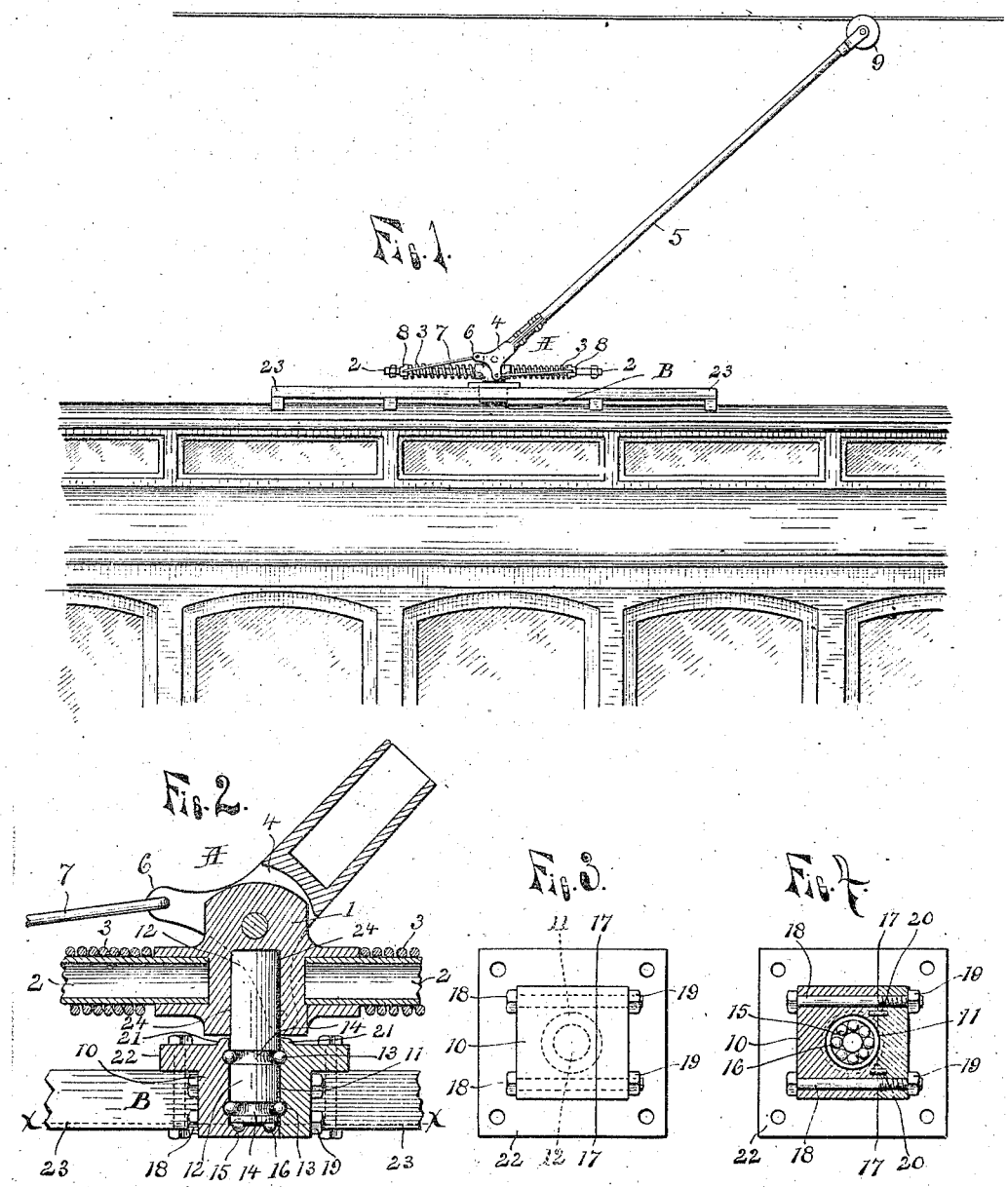
WITNESSES.
Lewis E. Flanders
Thomas G. Longstaff
INVENTOR.
James Kermath
By
Attorneys.

No. 749,795.

Patented January 19, 1904.

UNITED STATES PATENT OFFICE.

JAMES KERMATH, OF DETROIT, MICHIGAN, ASSIGNOR, BY DIRECT AND MESNE ASSIGNMENTS, TO ECLIPSE MANUFACTURING COMPANY, A CORPORATION OF MICHIGAN.

TROLLEY-STAND.

SPECIFICATION forming part of Letters Patent No. 749,795, dated January 19, 1904.

Application filed October 9, 1903. Serial No. 176,328. (No model.)

*To all whom it may concern:*

Be it known that I, JAMES KERMATH, a citizen of the United States of America, residing at Detroit, in the county of Wayne and State of Michigan, have invented certain new and useful Improvements in Trolley - Stands, of which the following is a specification, reference being had therein to the accompanying drawings.

This invention relates to improvements in trolley-stands, and especially to bases for such stands; and its object is to provide a base upon which the stand will turn freely to accommodate the lateral movement of the trolley-pole and which is so constructed that the stand is supported as close to the top of the car as possible, therefore offering no hindrance in going beneath viaducts and similar structures where the space between the roof of the car and the structure is very limited, the invention consisting in the particular construction, arrangement, and combination of parts, all as hereinafter more fully described, and shown in the accompanying drawings, in which—

Figure 1 is a side elevation of a portion of a car, showing the device in operative position thereon. Fig. 2 is a vertical section of the base and stand; Fig. 3, an inverted plan view of the base, and Fig. 4 a similar view showing the base in section on the line *x x* of Fig. 2.

A is the trolley-stand proper, consisting of a head or casting 1, carrying the oppositely-extending arms 2, upon which are sleeved the coiled springs 3, and pivotally secured to this head is a yoke 4, to which the lower end of the trolley-pole 5 is secured, said yoke being provided with laterally-extending ears or arms 6, to which the rods 7 are pivotally attached at one end, their opposite ends being attached to collars 8, sleeved upon the arms 2 and engaging the outer ends of the spring 3, all as ordinarily constructed and arranged to yieldingly hold the trolley-wheel 9 in contact with the trolley-wire.

B is the trolley-base, consisting of a rectangular casting 10, which is bored out to form a socket 11 for the pivot-post 12, said post fitting loosely within the socket and held therein by two series of balls 13 within grooves 14, one half of each groove being formed in the post and the other half in the wall of the socket. The post is supported within the socket by balls 15 within a groove 16, one half of which is formed in the bottom of the socket and the other half in the lower end of the post, so that the post turns freely upon said balls and is prevented from contacting the sides of the socket by the balls 13. The balls 13 are inserted in their grooves by forming the casting of two parts, the dividing-line 17 extending transversely of the casting and cutting into the socket slightly at one side, or just enough to form openings into said grooves through the side of the casting, through which openings the balls may be inserted when the parts are separated. The two parts of the casting are secured together after the post and balls are in place by bolts 18, each provided with a head at one end and screw-threaded at its opposite end to engage the screw-threaded openings in one part of the casting, a lock-nut 19 being provided on the screw-threaded end of each to prevent the bolts from working loose, and thus the post is held within its socket against removal, but free to turn therein. To accurately center the two parts of the casting, so that the grooves in one part will register with those of the other part accurately, the dowel-pins 20 are provided, and thus the necessity of using finished bolts is obviated.

The casting 10 is provided with a raised portion or rib 21 on its upper face surrounding the socket therein and beneath the head 1 of the stand, so that the rain running down the sides of the head and falling upon the base will be prevented from getting into the socket and displacing the oil or other lubricant with which the socket is filled after the post is in place therein. The bearing upon which the trolley-stand turns is thus continually run in oil, and the friction thereby reduced to the minimum.

The socket-casting 10 is provided with a flange 22, extending outward from its upper end, by means of which it is secured by bolts to the running-boards 23 or other suitable part of the car, that portion of the casting which extends below the flange extending downward between the boards, and thus the trolley-stand is supported very close to the car-roof, the construction also permitting the use of a short stand-head 1, as the post 12 does not turn in the head, but fits tightly within a socket 24 provided in said head to receive the upper end of the post, said stand being thus firmly supported by the post, which turns freely upon the balls in the base. The post may, however, be made an integral part of the head or secured thereto; but for convenience in assembling and in removing the stand from the base for repair, &c., it is considered the better construction to fit the posts tightly within the socket, as described, as the post does not turn thereon, but turns within the base.

Having thus fully described my invention, what I claim is—

1. The combination, with a trolley-stand, of a base provided with a socket having grooves in its side walls and divided transversely into two parts upon a line extending through said grooves at one side of the socket, a pivot-post provided with grooves to coincide with the grooves in the socket, balls adapted to be inserted in said grooves through the openings formed by dividing the base, and bolts extending through openings in each part of the base to secure the parts together.

2. The combination, with a trolley-stand, of a base provided with a socket having grooves in its side walls and bottom and divided transversely into two parts, a pivot-post for supporting the stand and provided with grooves in its side and lower end to correspond with the grooves in the socket, balls in said grooves, dowel-pins on one of the parts of the base to engage openings in the other part, bolts, extending through openings in one part of the base and engaging screw-threaded openings in the other part to secure the parts together, and lock-nuts on said bolts.

3. The combination, with a trolley-stand, of a base provided with a socket having grooves in its side walls and divided transversely into two parts upon a line extending through said grooves at one side of the socket, a pivot-post provided with grooves to coincide with the grooves in the socket, balls adapted to be inserted in said grooves through the openings formed by dividing the base, bolts to secure the parts together, and balls interposed between the lower end of the post and base.

In testimony whereof I affix my signature in presence of two witnesses.

JAMES KERMATH.

Witnesses:
 OTTO F. BARTHEL,
 LEWIS E. FLANDERS.